US007532256B2

(12) United States Patent
DeWitt et al.

(10) Patent No.: US 7,532,256 B2
(45) Date of Patent: May 12, 2009

(54) METHODS AND APPARATUS FOR DETECTING SCENES IN A VIDEO MEDIUM

(75) Inventors: Keri DeWitt, Los Angeles, CA (US); Thomas Majchrowski, Irvine, CA (US)

(73) Assignee: Teresis Media Management, Santa Ana, CA (US)

( * ) Notice: Subject to any disclaimer, the term of this patent is extended or adjusted under 35 U.S.C. 154(b) by 735 days.

(21) Appl. No.: 11/042,437

(22) Filed: Jan. 25, 2005

(65) Prior Publication Data

US 2006/0165283 A1 Jul. 27, 2006

(51) Int. Cl.
*H04N 5/14* (2006.01)

(52) U.S. Cl. ............... 348/700; 348/143; 348/699; 348/155; 348/154; 348/701

(58) Field of Classification Search ............... 348/700, 348/143, 699, 155, 154, 701
See application file for complete search history.

(56) References Cited

U.S. PATENT DOCUMENTS

| | | | | |
|---|---|---|---|---|
| 5,617,149 A * | 4/1997 | Lee et al. | | 348/699 |
| 5,751,378 A * | 5/1998 | Chen et al. | | 348/700 |
| 5,880,775 A * | 3/1999 | Ross | | 348/143 |
| 7,149,361 B2 * | 12/2006 | Peele et al. | | 382/236 |
| 2003/0123726 A1 * | 7/2003 | Suh | | 382/170 |
| 2004/0008284 A1 * | 1/2004 | Kim | | 348/699 |
| 2004/0114054 A1 * | 6/2004 | Mansfield et al. | | 348/700 |
| 2005/0078222 A1 * | 4/2005 | Liu et al. | | 348/700 |

* cited by examiner

*Primary Examiner*—Shawn An
(74) *Attorney, Agent, or Firm*—Sheppard Mullin Richter & Hampton

(57) ABSTRACT

Methods and apparatuses of detecting the beginnings and endings of scenes in video media, especially videotapes of "Reality TV" scenes, are disclosed. The video medium defines an array of pixels, and comprises a sequence of video frames. Each frame has a set of pixel data values for representing an image, with each pixel data value being associated with a pixel. Exemplary methods and apparatuses select a plurality of video frames from the video medium, and obtain the pixel data values of a subset of pixels of each selected frame. The pixel subsets of at least one pair of successive frames have a difference in the selection of pixels. A dispersion signal representative of the dispersion in the obtained pixel data values over a set of sequential frames is generated, and a signal is generated to indicate an end of a scene when the dispersion signal falls below a threshold level.

17 Claims, 7 Drawing Sheets

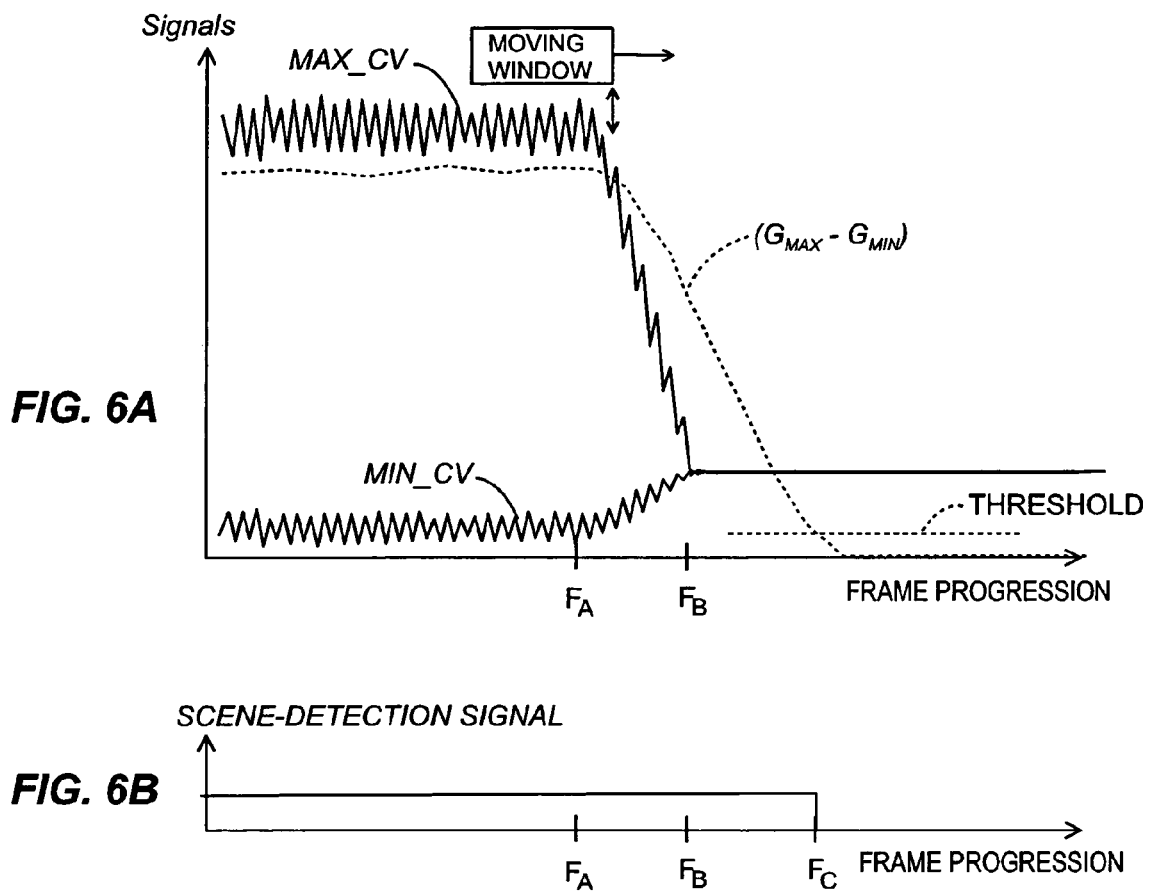

METHODS AND APPARATUS FOR DETECTING SCENES IN A VIDEO MEDIUM

FIELD OF THE INVENTION

The present invention relates to methods and apparatuses for detecting the beginnings and endings of scenes in video media (i.e., video mediums), such as video telecasts, streaming videos conveyed over the Internet, and videos recorded on analog tape, digital tape, video disc, optical discs, and the like.

BACKGROUND OF THE INVENTION

Recently, the entertainment industry has developed a new genre of movie/television entertainment called "Reality TV," or "unscripted programming." In this genre, untrained actors are placed in various settings with general direction and rules to guide their interactions, but without a specific script for actions or dialog. Beforehand, the production staff has a general idea of the storyline for the production, but the final storyline will depend upon the interactions that take place. Several video cameras are located within the settings and record the interactions among the actors for long periods of time. Various stimuli may be introduced into the settings by the production staff to provoke unpredictable interactions among the actors. After several settings have been videotaped for several hours over several days by several cameras, the production staff reviews hundreds to thousands of hours of videotape and constructs a final storyline for the show.

The mechanics of collecting and cataloging such a huge volume of videotape has given rise to the need to digitize the tapes and to automatically detect the beginnings and endings of scenes, and especially to detect the ending of the last scene on a videotape. The latter need is particularly important to address, because many tapes are only recorded on a portion of their full length due to the somewhat haphazard nature of the filming for this genre, and because the expense and time needed for digitization and cataloging should not be wasted on blank tape.

This task of automatically detecting the end of a scene is complicated by several factors. First, there are often several minutes with no activity in a scene. Thus, attempting to detect the end of a scene by detecting the lack of motion in the video image would not work. Second, the cameras are often placed in close proximity to the actors, who often walk in front of the camera lens during a scene, causing a considerable change in the brightness of the video image. Thus, attempting to detect the end of a scene by detecting a large change in the brightness of the video image would not work. Another complicating factor is that video can be stored and conveyed in several different analog and digital formats, some of which do not have data fields for time stamps. And even if a video medium does have data fields for time stamps, there remains the likelihood that the camera will be set to record without the time stamp function being activated. Thus, relying on time stamp codes to determine the end of a scene is not practical when hundreds to thousands of hours of video recordings need to be digitized and cataloged. Thus, the problem remains unsolved.

The accurate detection of the beginning of a scene also has important applications. One such application is in the field of television program distribution where local commercial programming has to be interleaved between the segments of a television program. The television program may be provided to the local broadcaster in either live feed form, or on videotape. In either case, the time periods for the local commercials are marked out on the video medium. A human operator views the medium as it is fed or played to local broadcast, and then switches a commercial segment onto the local broadcast at the end of each program segment, during the marked out periods. After the commercial programming segment ends, the human operator places a local-station identifier (or other filler) on the local broadcast until the next program segment starts. Here, the human operator is needed to watch for the start of the new program segment on the live feed or the videotape in order to remove the local-station identifier from the local broadcast and feed the next program segment onto the local broadcast. This is a tedious task for the human operator, and is prone to errors.

Before describing the present invention and how it solves the above problems related to scene detection, we provide a brief description of video media. Moving pictures can be electronically conveyed and stored on a variety of video media. A video medium comprises a sequence of video frames to be displayed in sequential order at a specific frame rate, with each video frame being one complete picture. The video medium further comprises a format for defining the aspect ratio of the display area, the resolution of the display area, and the frame rate of the video frames. There are analog formats such as NTSC, PAL, VHS, and BETAMAX, and digital formats such as MPEG-2, CCIR-601, AVI, and DV. Each format, and hence each video medium, defines an array of pixels for the video frames, and hence defines an array of pixels for displaying the visual images that are to be conveyed or stored by the medium. The pixel array is dimensioned to span an area having the same aspect ratio as that defined by the format, and to have a density of pixels along the dimensions of the area in accordance with the resolution defined by the format. The aspect ratio is usually square or rectangular, and the pixels are usually arranged in the form of rows and columns, although other patterns are possible (such as hexagonal close packed). Each video frame comprises a set of pixel data values for representing an image on the array of pixels, each pixel data value being associated with a pixel in the array.

In analog video formats, the number of rows of pixels is fixed at a predetermined number, while the analog signal theoretically enables an infinite number of columns of pixels. Conventional television screens, however, limit the number of columns so that the density of the columns is within 100% to 200% of the density of the rows, as a practical matter. Some digital video formats have a preset number of pixels along each dimension of the display area, whereas others have user-defined values. For example, the CCIR-601 video format has 526 rows of pixels and 720 columns of pixels, whereas the MPEG-2 format permits the dimensions to be user-defined. However, there are several standardized dimensions for MPEG-2, ranging from 352×288 (columns×rows) to 720×480. Most video formats have set frame rates, whereas some have user-defined frame rates (e.g., MPEG-2). For those formats that have user-defined parameters, the format sets aside digital bits within the video medium to convey or store the user-defined parameters so that the images stored by the video medium can be properly rendered. In addition, some video formats, such as NTSC, divide each frame into two interlaced fields (A-field and B-field) such that the two fields are shown in successive order at twice the frame rate. As indicated above, the wide variety of video formats is a complicating factor for the task of detecting scenes in video produced in the unscripted environment.

SUMMARY OF THE INVENTION

The present invention broadly encompasses methods and apparatuses of detecting scenes in video media, including stored video media, live broadcast video media, and streaming video media. Each such video media defines an array of pixels for displaying its video content, and comprises a sequence of video frames. Each video frame has a set of pixel data values for representing an image on the array of pixels, with each pixel data value being associated with a pixel in the array. Exemplary methods according to the present invention comprise selecting a plurality of video frames from the video medium, with the selected video frames having a sequential order related to the order in which they occur in the video medium, and obtaining the pixel data values of a subset of pixels of each selected video frame. All of the video frames may be selected, or a reduced number may be selected. The pixel subsets of at least one pair of successive selected video frames have a difference in the selection of pixels. In preferred embodiments, the pixel subsets of all the pairs of successive selected video frames are different, and more than 50% of the pixels in successive pixel subsets are different. In further preferred embodiments, 75% to 100% of the pixels in successive pixel subsets are different. Exemplary methods of the present invention further comprise generating a dispersion signal representative of the dispersion in the obtained pixel data values over a group of sequential selected video frames, generating a scene-detection signal indicating the presence of a scene when the dispersion signal is above a threshold value, and indicating the absence of a scene when the dispersion signal is below a threshold value. As one example, the group of sequential selected video frames may comprise a number n of the video frames most recently selected from the video medium, as the video frames are sequenced in the normal playing order, or in the reverse order (i.e., played backwards).

A beginning of a scene may be detected by observing a change in the scene-detection signal from indicating the absence of a scene to indicating the presence of a scene. An ending of a scene may be detected by observing a change in the scene-detection signal from indicating the presence of a scene to indicating the absence of a scene.

As indicated above, the task of automatically detecting scenes in the TV program segments for local broadcast and in video produced in the unscripted environment is complicated by several factors, including the use of different video formats and different camera models. Through their investigations, and as part of making their invention, the inventors found that video produced in the unscripted environment produces several tens to hundreds of frames of substantially uniform luminescence and substantially uniform color between scenes and at the end of the last scene on videotape. These characteristics may be detected by exemplary methods according to the present invention as follows. The use of different pixel subsets for successive selected video frames accomplishes an efficient spatial sampling of the video content of the video medium over both the forward playing time and reverse playing time of the video medium. During the normal acting scene, the changing pixel subsets will result in a high dispersion of the obtained pixel data values, even during intervals with no motion in the picture. On the other hand, a low dispersion of the obtained pixel data values will occur when a sequence of frames having substantially uniform luminescence and substantially uniform color occurs, despite the fact that the pixel subsets are changing. Thus, by the exemplary steps outlined above, the beginnings of video scenes produced in an unscripted environment can be detected by detecting when the dispersion of the pixel data values rises above a predetermined value, and the endings can be detected by detecting when the dispersion falls below the predetermined value.

This creation of the invention has further led the inventors to recognize that the task of interleaving local commercial programming between the segments of a television program can be automated by having the producer of the television program mark the time periods for local commercials with uniformly painted video frames. In this way, the beginning and endings of the program segments can be detected with the dispersion signal, as described above. Furthermore, the scene-detection signal can be used as input to a computer control program that automatically switches the program segments, the local commercial segments, and local-station identifier (and other fillers) on and off of the local broadcast in a desired and logical order.

Accordingly, it is an object of the present invention to enable the reliable detection of scenes in video, audio, and multimedia mediums.

It is another object of the present invention to enable the detection of scenes with low computational requirements on a processor.

It is another object of the present invention to enable the reliable detection of scenes despite the lack of motion in the video or blockage of the camera view by an actor.

It is yet another object of the present invention to enable the reliable detection of scene beginnings and endings without relying upon the presence of time stamps within the video medium, and thus enable the reliable detection of scene beginnings and scene endings without regard to the format of the video medium.

These objects and others will become apparent to one of ordinary skill in the art from the present specification, claims, and attached drawings.

BRIEF DESCRIPTION OF THE DRAWINGS

FIG. 6A is a graph of exemplary video content signals and a corresponding exemplary dispersion signal for a sample video medium according to the present invention.

FIG. 6B is a graph illustrating the generation of the scene-detection signal from the dispersion signal of FIG. 6A and a threshold level according to the present invention.

DETAILED DESCRIPTION OF THE INVENTION

In exemplary methods and apparatuses of the present invention, video frames of a video medium are selected in a repetitive manner over the playing time of the medium, and the pixel data values of a subset of pixels of each selected video frame are obtained, with different pixel subsets being used for successive selected video frames. An assessment of the dispersion (e.g., variation) in the pixel data values is made over successive sets of selected frames (e.g., over the playing time of the video medium), and a dispersion signal is generated from the assessment. The presence of a scene is indicated when the dispersion is above a threshold value that has been set beforehand, and the absence of a scene is indicated when the dispersion is below the threshold value. The assessment of the dispersion signal may be accomplished in a number of ways, which are described below. The exemplary methods are typically implemented by a general computer processor operating under the direction of instruction sets, and exemplary apparatuses according to the present invention may comprise computer processors operating under the direction of such instruction sets.

Figure 1:
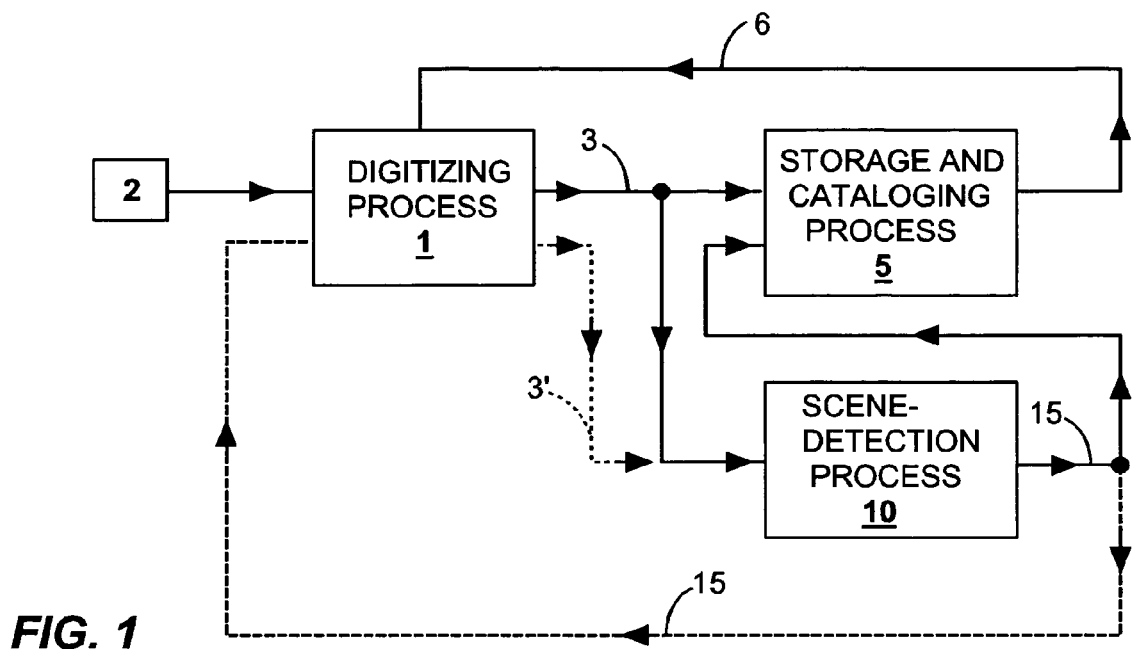
FIG. 1 illustrates an exemplary application in which the present invention may be used.

In a typical application, which is illustrated in FIG. 1, the video frames are generated in real time by an unrelated process 1 that may digitize an analog video signal 2, the latter of which may originate from a videotape player. The video signal may also originate from a digital-format tape, in which case process 1 merely reads the digitized frame information in sequential order, and may further decompress (decode) the data (if needed) or convert it to another digital format. In either case, a digital signal is provided in a video stream 3 to a storage and cataloging process 5, and to a scene-detection process 10 according to the present invention. The scene-detection process 10 can be used to monitor the digitized video frames as they are generated, and to inform the storage and cataloging process 5 of the presence or absence of a scene by an output signal 15. The output signal 15 has a first state indicating the presence of a scene and a second state indicating the absence of a scene. The beginning of a scene in the video medium can then be detected when output signal 15 transitions from its second state to its first state. Upon detecting this transition in output signal 15, the storage and cataloging process 5 may take appropriate action according to its cataloging rules. For example, process 5 may open a new storage file for the scene or set a next-scene marker in an existing storage file. The end of the video medium (e.g., the end of the videotape being digitized) can then be detected when output signal 15 transitions from its first state to its second state. Upon detecting this transition in output signal 15, the storage and cataloging process 5 may take appropriate action according to its cataloging rules. For example, process 5 may set a scene marker in the stored file, or may close the existing storage file and start a new storage file for the next scene. Upon detecting a long duration of the second state of signal 15, process 5 may close the existing storage file, instruct the digitization process to stop by way of stop signal 6, and then finalize its records. As an alternative or a supplement, output signal 15 may be directly provided to digitizing process 1, which may stop the digitization process itself upon detecting a long duration of the second state of signal 15.

Each of processes 1, 5, and 10 may be executed by a respective computer processor under the direction of a respective set of instructions, or all of the processes may be executed by a common computer processor that uses multi-tasking to execute the respective sets of instructions. In addition, process 10 may be executed concurrently with either one of processes 1 and 5 on a common computer processor that uses multi-tasking to execute the respective sets of instructions.

Video stream 3 may be in a video format that has full frames (e.g., standard AVI format), or may be in a format that has a mixture of full frames and delta frames (e.g., MPEG-2). In a video format with all full frames, the pixel data values of each video frame are provided in full; however, they may be compressed by an encoding process. In a typical video format having a mixture of full frames and delta frames, the pixel data values of full frames are provided in full, whereas the pixel data values of the delta frames are provided as difference quantities with respect to the last full frame and/or the next full frame. The difference quantities of the delta frames require less storage and bandwidth, and may also be compressed by an encoding process. While scene-detection process 10 can work with video media having delta frames or frames with compressed pixel data values, preferred embodiments of scene-detection process 10 work with media having uncompressed full frames. As part of its operation, a typical compressing digitizing process 1 initially generates uncompressed full frames, and then sends these frames through a compressor (e.g., a codec) before outputting the frames as video stream 3. (The compressor generates some of the frames as delta frames, and usually compresses the pixel data values of all of the frames.) In this case, it is a relatively simple matter to modify digitizing process 1 to provide an uncompressed video stream 3' for preferred embodiments of scene-detection process 10 to use.

Scene-detection process 10 can work with a compressed video stream 3 in a number of ways. As one way, it can first send the video stream through a full decoder which decodes the stream to generate full frames for each of the delta frames. As another way, it can send the video stream through a partial decoder which only decodes the full frames and a small number of delta frames, and then can examine only those frames. As yet another way, process 10 can skip over the delta frames and only select full frames for examination, and decompress the selected frames if necessary. However, this is best done when a relatively low limit has been placed on the maximum separation distance between full frames by the initial compression process, such as eight to sixteen frames (e.g., low compression).

Figure 2:
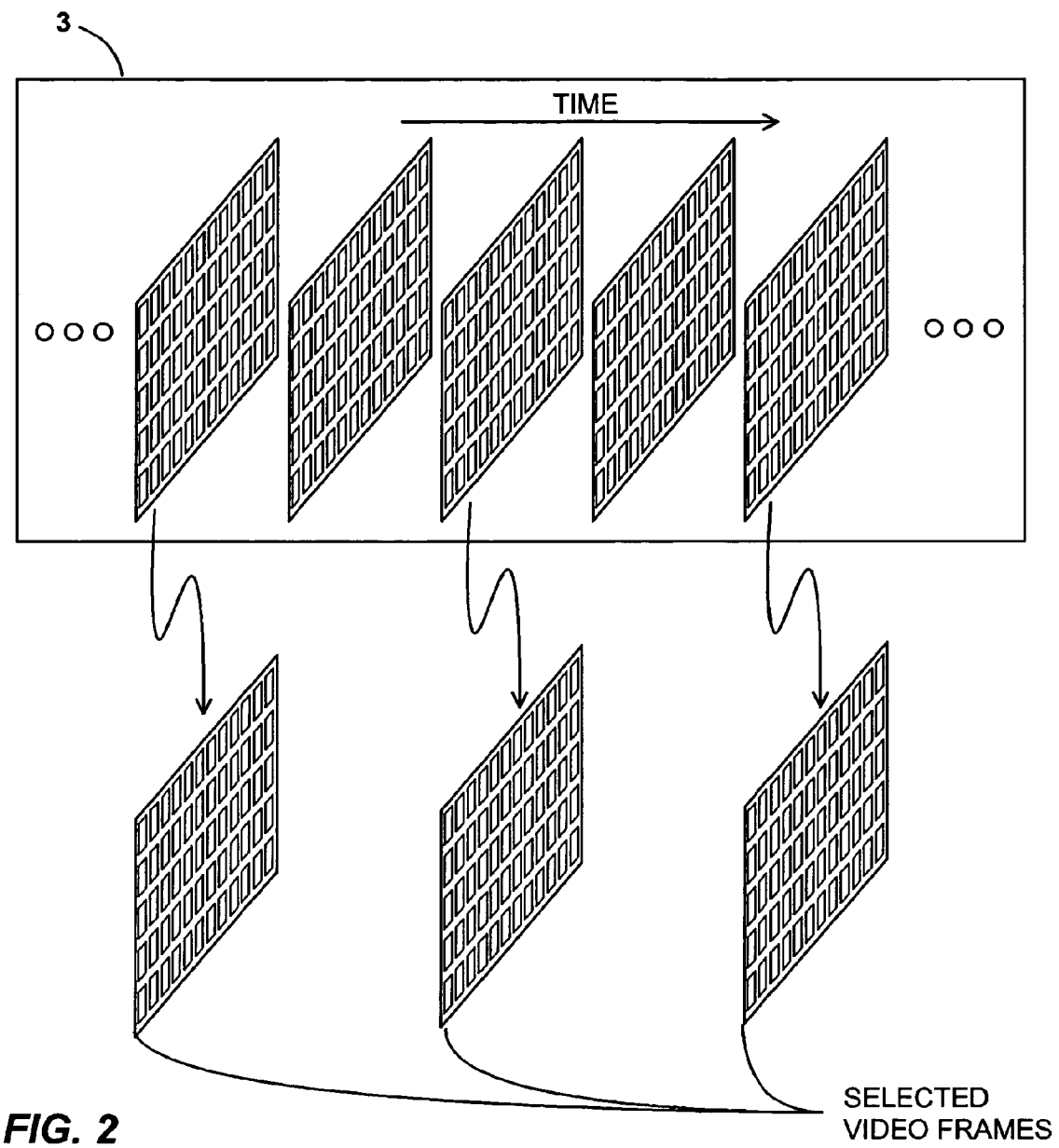
FIG. 2 schematically illustrates an exemplary process of selecting video frames from a video stream for examination according to the present invention.

FIG. 2 schematically illustrates the process of selecting video frames from a video stream 3 for examination according to the present invention. Every frame may be selected for examination, or a reduced number of frames may be selected to reduce the load on the computer processor. In the latter case, one frame in a group of N frames, where $N \geq 2$, may be selected in a periodic manner, such as every other frame (N=2) or every third frame (N=3). FIG. 2 illustrates a case of selecting every other frame (N=2). The video frames may also be selected using an asymmetric pattern of skipped frames; for example after selecting a frame, two frames are skipped before selecting the next frame, and then three frames are skipped before selecting the next frame. The video frames may also be selected in a random manner or pseudo-random manner, as long as there is a reasonable upper limit placed on the number of frames that are skipped over. The random or pseudo-random selection processes may occur in the case where video stream 3 has a mixture of full frames and delta frames, and process 10 skips the delta frames and only uses the full frames, with the full frames being generated at a random or pseudo-random rate by the video compressor. It may also occur in a case where the processor does not have sufficient speed to select and process the frames in the periodic manner given the streaming rate of the video frames. Asymmetric frame selection, random frame selection, and pseudo-random frame selection are examples of aperiodic frame selection (i.e., not occurring at a regular interval). While the above selection processes are different in one or more respects, they all select video frames from stream 3 in a repetitive manner over time, where the repetitive manner can select all of the frames, or can select a reduced number of frames in either a periodic manner or an aperiodic manner.

Figure 3:
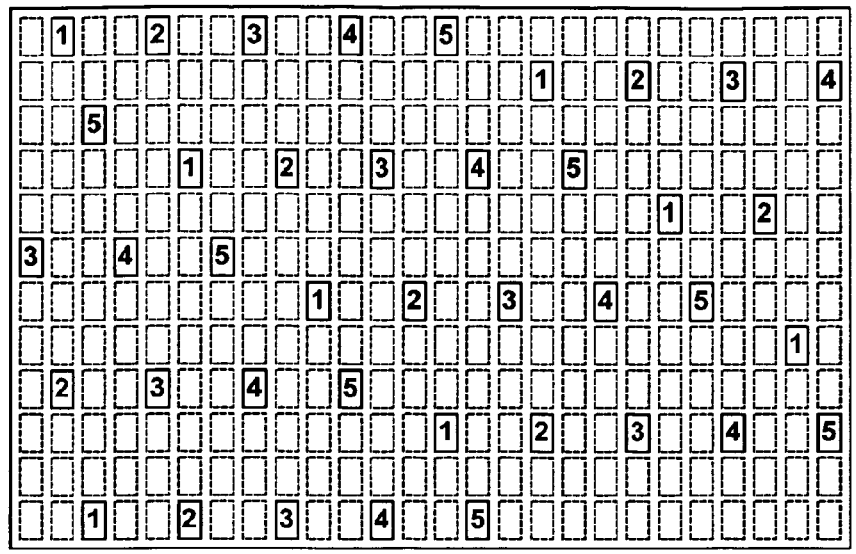
FIG. 3 illustrates the different pixel subsets according to the present invention.

As the next step in the exemplary methods according to the present invention, the pixel data values of a subset of pixels of each selected video frame are obtained, with different pixel subsets being used for successive selected video frames. Subsequent exemplary steps will make an assessment of the dispersion (e.g., variation) in the pixel data values over a moving set of successive selected video frames to assess the progression of the dispersion over the playing time of the video medium. The different pixel subsets are illustrated in FIG. 3, which shows a video frame with a plurality of pixels outlined in dashed lines. The number of frame pixels in a typical video format ranges between ~100,000 and ~500,000. Five different pixel subsets are shown and separately identified by numbers "1" through "5." The first pixel subset selects only those pixels that have the number "1" placed on them, and the second pixel subset selects only those pixels that have the number "2" placed on them, and so on. Each pixel subset preferably has the same number of pixels, but at different locations within the frame. Each pixel subset enables one to sample the spatial variation of the dispersion in the pixel data values, with the spatial sampling being varied over time. There may be between 200 and 800 pixels in a pixel subset, which is typically less than 1% of the total number of pixels in a frame. While FIG. 3 shows five pixel subsets, it will be appreciated that one may define and use more than this, such as in the range of ten to several hundred, or more. Also, fewer pixel sets may be used, such as three or four. A typical video medium has about 100,000 video frames per hour of running time. Thus, as a practical matter, the pixel subsets are reused several times, and are typically cycled through in a set order.

The locations of the pixels of a subset may be chosen in a predictable manner or a random (or pseudo-random) manner. The pixel subsets shown in FIG. 3 are chosen in a predictable manner where adjacent pixels within each subset are separated by a uniform distance, with each subset starting at a different location in the top row (i.e., starting with a different offset). An advantage of predictable pixel-subset selections is that they can often be implemented in real-time with a small number of computer instructions that do not burden the processor or require much computer memory. Random and pseudo-random pixel-subset selection methods often place greater computation burdens on the processor when implemented in real-time. Random and pseudo-random pixel subsets can be pre-computed and stored in memory beforehand; however, this usually requires more computer memory. In preferred embodiments, at least 50% of the pixels in successive pixel subsets are different, and more preferably 75% to 100% of the pixels in successive pixel subsets are different. However, the present invention may be implemented with percentages as low as 25% to 33%.

Once the pixel subset for a video frame has been selected, the pixel data values of the pixels identified by the pixel subset are obtained from the selected video frame. These pixel data values will be examined to assess their spatial dispersion. To better understand how the dispersion can be assessed, we first explain how black-and-white data and color data are commonly represented in pixel data values. The pixel data value of a single pixel for black-and-white video generally comprises a single byte of data that contains the luminescence value (i.e., the brightness of the white color). The data value ranges from 0 for black to 255 for white, with intermediate values representing shades of gray. For color video, there are several systems for representing the color data of a pixel, but each uses three or four separate components, instead of the one component used in black-and-white video. A common method used in computer screens is the RGB system, which comprises one byte for the red intensity (R-byte), one byte for the green intensity (G-byte), and one byte for the blue intensity (B-byte), for a total of 24 bits. A common method used in digital video recording equipment is the luminance/chrominance system, more commonly called the YUV system. In this system one byte is used to represent the luminescence of the pixel (the Y-byte), and two bytes (the U-byte and the V-byte) are used to represent the color of the signal as differences from the luminescence byte. The Y, U, and V values may be related to the R, G, and B values by the following conversion equations:

$$Y = +0.299*R + 0.587*G + 0.114*B$$

$$U = 0.492*(B-Y) = -0.147*R - 0.289*G + 0.436*B$$

$$V = 0.877*(R-Y) = +0.615*R - 0.515*G - 0.100*B$$

The primary advantage of the YUV system and its derivatives (YIQ, YdbDr, etc.) is that they remain compatible with black-and-white video format, and particularly the analog black-and-white television format. The Y signal is essentially the same signal that would be broadcast from a normal black-and-white television camera (with some subtle changes), and the U and V signals can simply be ignored when rendering the video in black-and-white form. There are additional color representation systems that may be encountered, but the above systems are the most common in video media. The other systems generally comprise three or four color components, which can be related to each of the RGB and YUV systems by appropriate conversion equations. Examples include the Hue-Saturation-Brightness (HSB) system and the Cyan-Magenta-Yellow (CMY) system.

From the above, one can see that by concatenating the Y, U, and V bytes together, with the Y-byte being the most significant and the V-byte being the least significant, a single number (24 bits wide) can be obtained that is reasonably representative of the color content of the pixel data value, as perceived by a human viewer. Another approach providing a reasonable representation is to add together the values provided by the U-byte and V-byte to generate a composite (U+V)-byte (which may be truncated to the eight most significant bits), and to concatenate the Y-byte with the composite (U+V)-byte, with the Y-byte being the most significant. This produces a number that is 16 bits wide. Yet another approach is to add together the values provided by Y and the composite (U+V)-byte. When working in RGB format, a reasonably good representation of the color content of a pixel can be obtained by concatenating the G-, R-, and B-bytes together, with the G-byte being the most significant and the B-byte being the least significant. (As can be seen from the above equations, the green signal G is the dominant component of the luminescence signal Y.) Another approach is to add together the values provided by the R-byte and the B-byte to generate a composite (R+B)-byte (which may be truncated to the eight most significant bits), and to concatenate the G-byte with the composite (R+B)-byte, with the G-byte being the most significant.

The next step of assessing the dispersion (e.g., variation) in the pixel data values over the playing time of the video medium may be accomplished by a number of different processes. We first describe a preferred process that achieves reliable scene detection with little computational burden. In this preferred process, a video content value is generated for each selected video frame, and the dispersion of the video content values is monitored over the playing of the video medium (in either the forward direction or the reverse direction). When the dispersion is above a predetermined threshold value, a scene-detection signal is generated in a logic state that indicates the presence of a scene; and when the dispersion is below the predetermined threshold value, the scene-detection signal is generated in a logic state that indicates the absence of a scene. More than one video content value may be monitored for its dispersion, and the generation of the scene-detection signal may be conditioned upon the states of all of the dispersions with respect to their respective threshold values. For example, one or more dispersion signals being above their respective thresholds would indicate the presence of a scene, whereas the majority (or all) of the dispersion signals being below their respective thresholds would indicate the absence of a scene.

A video content value can be generated in a number of ways, and is intended to be reflective of luminescence content and/or color content of the frame. In general, a video content value can be any function of the selected pixel data values that satisfies the following two conditions:

(1) the function produces the same video content value with each of the pixel subsets when the selected video frame is uniformly painted with a color at a uniform luminescence; and (2) the function produces different video content values among at least two of the pixel subsets whenever the selected video frame has a non-uniform color and/or non-uniform luminescence.

In preferred embodiments, condition (1) is true not only for a single color (such as gray or blue), but for several colors, and more preferably for all colors. The examples provided in the next paragraph satisfy condition (1) for all colors.

Exemplary functions that satisfy the above two conditions include a summation of the pixel data values of a pixel subset, and an average of the pixel data value, which is equal to the summation divided by the number of pixels in the subset. When working with pixel data values in YUV format, examples of summations that can be used are: (1) a summation of the Y-bytes, (2) a summation of the concatenated Y-, U-, and V-bytes, (3) a summation of the concatenated Y-byte and composite (U+V)-byte, and (4) a summation of another combination of the Y-, U-, and V-bytes. Corresponding averages may be generated from the summations by dividing the summations by the number of pixels. In addition, one may construct two video content values and monitor the dispersion in both. For example, a first video content value may comprise a summation of the Y-bytes of the pixel data values of a pixel subset, and a second video content value may comprise a summation of the composite (U+V)-bytes of the pixel data values of the pixel subset. The first video content value would be useful in monitoring the dispersion in the luminescence of the video stream, and the second video content value would be useful in monitoring the dispersion in the chrominance (picture color). Also, one may construct three video content values (one for each Y-, U-, and V-byte), and monitor the dispersion in all three. When working with pixel data in RGB format, examples of summations that can be used are: (1) a summation of the concatenated G-, R-, and B-bytes, (2) a summation of the concatenated G- and composite (R+B)-bytes, or (3) a summation of another combination of the R-, G-, and B-bytes. In addition, one may construct two video content values and monitor the dispersion in both. For example, a first video content value may comprise a summation of the G-bytes of the pixel data values of a pixel subset, and a second video content value may comprise a summation of the composite (R+B)-bytes of the pixel data values of the pixel subset. Also, one may construct three video content values (one for each R-, G-, and B-byte), and monitor the dispersion in all three.

As the next part of this preferred process of estimating the dispersion, the average of the video content values over a window of n sequential selected video frames is generated, and the standard deviation of the values from this average is generated. The average may be computed as:

$$AVG = \frac{1}{n} \cdot \sum_{i=1}^{n} VCV_i,$$

where AVG is the average and $VCV_i$ is the video content value of the i-th selected video frame in the window of n selected video frames. The standard deviation may be computed as:

$$STD.\ DEVIATION = \sqrt{\frac{1}{n} \cdot \sum_{i=1}^{n} (VCV_i - AVG)^2},$$

which serves as a dispersion signal. The window moves with the playing of the video frames, which may be in either the forward direction or reverse direction. Thus, the standard deviation is representative of the temporal dispersion of the video content values, which in turn are representative of the spatial dispersion in the pixel data values. The standard deviation signal is then monitored as successive video frames are played. The scene-detection signal is then generated in a first state indicating the presence of a scene when the standard deviation signal is above the threshold level, and in a second state indicating the absence of a scene when the standard deviation signal falls below a threshold level. To reduce computational requirements, one may omit the square-root operation in the above formula, which results in using the variance $\sigma^2$ as the dispersion signal instead of the standard deviation.

$$\sigma^2 = \frac{1}{n} \cdot \sum_{i=1}^{n} (VCV_i - AVG)^2$$

Figure 4A:
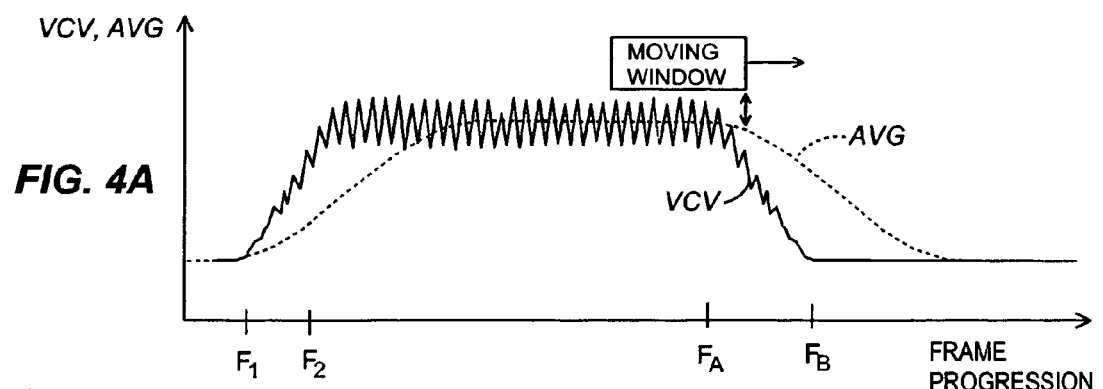
FIG. 4A is a graph of exemplary video content values VCV over several selected video frames for a sample video medium according to the present invention.

FIG. 4A shows a graph of the video content values VCV over several selected video frames for a sample video medium. A scene end begins at frame $F_A$ with a fading of the image over approximately 1 second, and finishes at frame $F_B$ with the video frames being painted with a common color, usually blue or black. The average AVG is shown in the figure by a dashed line, and is computed over a moving window that includes the current selected video frame and the n−1 most recently selected video frames (for a total of n frames). As an example, n may typically range between 15 and 30 frames, with approximately 20 frames being shown in the figure. The window moves forward (to the right) with each newly selected video frame, and the average value AVG computed at the newly selected video frame is associated with that frame, as indicated in the figure by the double-headed arrow below the window. However, it is within the skill of the art to change this association such that the computed AVG value may be associated with the oldest frame in the window rather than the newest, or any frame between the oldest and the newest. Prior to frame $F_A$, the VCV values vary due to the changes in the image and the use of different pixel subsets for the selected video frames. The variation generates a dispersion, which can be measured by the standard deviation with respect to the average AVG. As the video frames converge to a common color from frame $F_A$ to frame $F_B$, the VCV values move toward a value reflective of the common color. The average AVG moves toward this value as well, but with a delay of approximately n frames. During the time between frames $F_A$ and $F_B$, the temporal dispersion between adjacent frames is increased, but the spatial dispersion within each video frame tends to decrease as the frames progress.

Figure 4B:
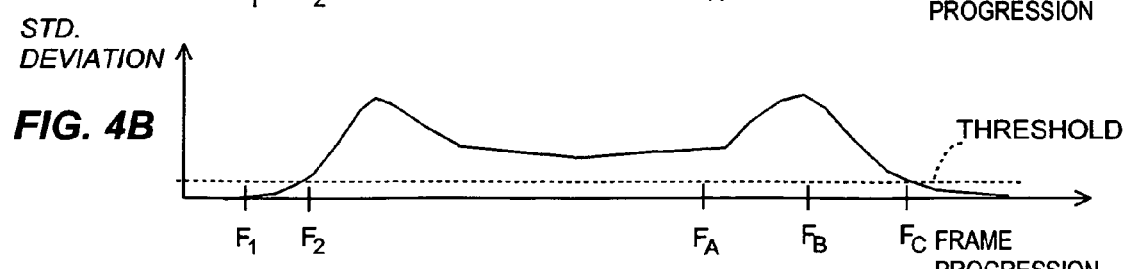
FIG. 4B is a graph of the standard deviation of the exemplary video content values VCV shown in FIG. 4A according to the present invention.
Figure 4C:
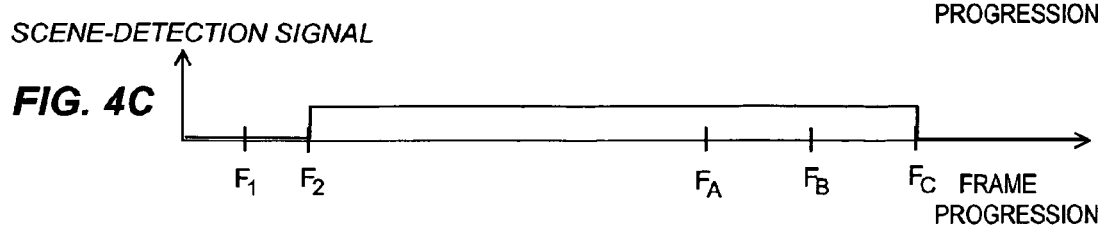
FIG. 4C is a graph illustrating the generation of the scene-detection signal from the standard deviation of FIG. 4B and a threshold level according to the present invention.

FIG. 4B shows the standard deviation of the video content values VCV with respect to the average AVG. The threshold value for setting the detection of the scene is shown in the figure by a dashed line. Prior to frame $F_A$, the standard deviation is well above the threshold value, and is reflective of both the spatial dispersion within each video frame and the temporal dispersion among the frames, as reflected by the VCV values. Between frames $F_A$ and $F_B$, the standard deviation increases in value due to the increased temporal dispersion in the VCV values, as described above. At frame $F_B$, the standard deviation begins a decline in value, and reaches the threshold approximately 15 frames later at frame $F_C$. The distance between frames $F_C$ and $F_B$ generally increases with increasing window length (n), and decreases with increasing threshold value. FIG. 4C shows the generation of the scene-detection signal in its first state (indicating the presence of a scene) prior to frame $F_C$, where the standard deviation is above the threshold; and the generation of the scene-detection signal in its second state (indicating the absence of a scene) after frame $F_C$, where the standard deviation falls below the threshold.

The approximate 15-frame delay between the scene end at frame $F_B$ and frame $F_C$ is approximately one-half second when each video frame in the medium is selected for examination, and approximately one second when every other video frame is selected. This amount of lag is tolerable for most applications for the "Reality TV" genre. However, a smaller lag can be achieved by introducing a frame delay buffer of 10 to 15 frames between the digitization process 1 and the storage and cataloging process 5 (shown in FIG. 1). In this manner, the video frames are provided to scene detection process 10 to 15 frames before they are provided to storage and cataloging process 5. The frame delay buffer can be provided within either process 1 or process 5, or may be added as a separate processing block within the figure. All of these options are readily implemented when a common processor is used to implement processes 1, 5, and 10. If digitizing process 1 compresses the video frames after digitization, there will typically be several frames of delay between the uncompressed video stream 3' and the compressed video stream 3, which can be used to reduce the lag time.

Also in FIGS. 4A-4C, we show the progression of the above signals at the beginning of a scene, which starts at frame $F_1$, and results in the scene-detection signal changing from its second state (indicating absence of a scene) to its first state (indicating the presence of a scene) at frame $F_2$.

During an acting scene, the standard deviation will vary over a range of values as a function of time, but will have a practical upper bound. The practical upper bound will depend upon what parts of the pixel data values are selected for examination, and how the various color components (e.g., Y, U, V, R, G, B) are combined. Nonetheless, the reasonable upper bound for a particular configuration of the process can be determined by running some sample video media through the process and noting the maximum value of the standard deviation. This can be done by those of ordinary skill in the art, without undue experimentation. When a scene end is encountered, the standard deviation typically drops to less than 5% of the practical upper bound, and usually drops to less than 2%, depending upon the amount of noise in the end-scene and between-scene video frames. (This can also be determined by running some sample video media through the process and noting the value between scenes and after the last scene end occurs.) The 5% and 2% levels may be used as threshold levels for generating a signal indicating the end of a scene.

The above example illustrates how the standard deviation with respect to the average of the VCV values can be used to generate a dispersion signal representative of the dispersion in the obtained pixel data values. It may be appreciated that the dispersion signal can also be generated in a number of other ways. First, as mentioned above, the variance $\sigma^2$ may be used as the dispersion signal instead of the standard deviation. Second, in place of the standard deviation, the absolute deviation may be used:

$$\text{ABSOLUTE DEVIATION} = \frac{1}{n} \cdot \sum_{i=1}^{n} |VCV_i - AVG|$$

As a third way, one may use the generalized deviation having the form of:

$$\text{GENERALIZED DEVIATION} = \left( \frac{1}{n} \cdot \sum_{i=1}^{n} |VCV_i - AVG|^y \right)^{1/y},$$

where y is a positive number, preferably greater than 1. There are also a number of computational short cut formulas known in the mathematics art for generating an approximation of each of the above deviations, and these short cut methods may also be used. In addition, in place of using the average AVG in the above-described deviations, one may use the median value or a truncated median value. Also, a weighted average, a generalized mean, a geometric mean, or a harmonic mean may be used instead of the average AVG, but these methods require more computational effort. The average AVG, the various forms of the median, and the various forms of the mean are all measures of the "central tendency" of the VCV values. The above examples illustrate that the broadest scope of the filed claims is not limited to the use of the standard deviation or the use of the average AVG values, but rather encompasses the use of any of the above examples.

As another approach, a max-min deviation may be used as a measure of dispersion instead of the standard deviation or the other above-described approaches. The max-min deviation is computed by examining the VCV values over the window to find the minimum VCV value ($VCV_{MIN}$) and the maximum VCV value ($VCV_{MAX}$), and generating the max-min deviation ($D_{MIN-MAX}$) as the absolute difference between the maximum and minimum values ($D_{MIN-MAX}=VCV_{MAX}-VCV_{MIN}$). The max-min deviation is equivalent to the range (or span) of the VCV values in the moving window. The computation of the min-max deviation does not require generation of the average AVG values or any other central-tendency values. As another measure of dispersion, one may use the interquartile range of the VCV values in the moving window. This involves sorting the VCV values into four quartiles, finding the dividing point between the first and second quartiles and the dividing point between the third and fourth quartiles, and then finding the absolute difference between VCV values at the two dividing points. Other measures of dispersion can be generated from the above examples by combination or by modification, and other ways of assessing dispersion known to the art can be used. The above examples illustrate that the broadest scope of the filed claims is not limited to the use of the standard deviation, but rather encompasses the use of any of these examples.

Figure 5A:
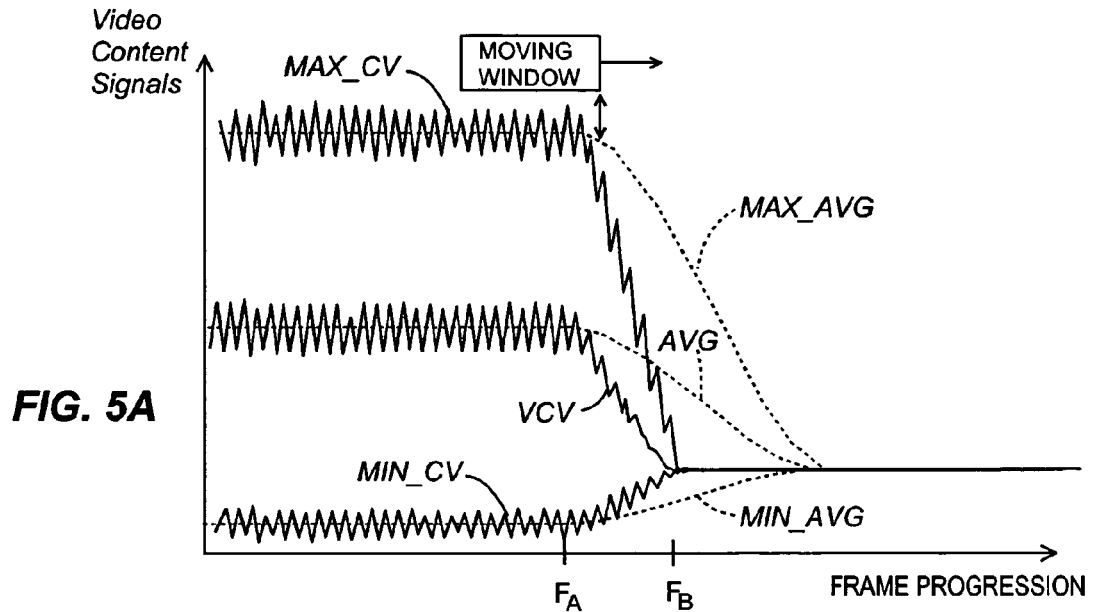
FIG. 5A is a graph of additional exemplary video content signals for a sample video medium according to the present invention.
Figure 5B:
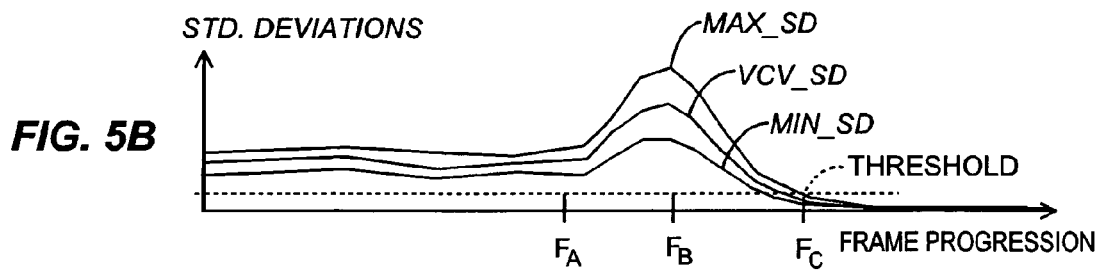
FIG. 5B is a graph of the standard deviations of the exemplary video content signals shown in FIG. 5A according to the present invention.
Figure 5C:
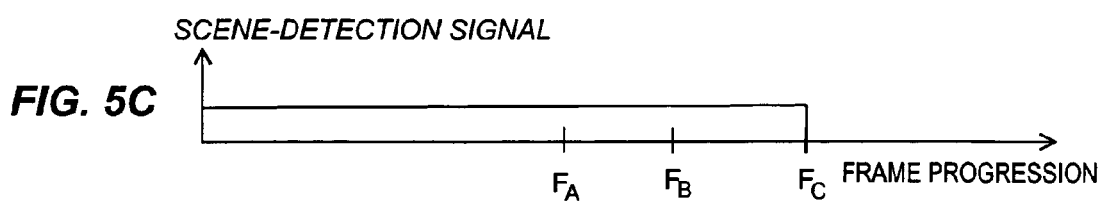
FIG. 5C is a graph illustrating the generation of the scene-detection signal from the standard deviations of FIG. 5B and a threshold level according to the present invention.

In the above examples, we have used a single VCV signal to assess the dispersion in the pixel data values. We mentioned above that one can also construct two or more VCV signals to assess the dispersion in the pixel data values, and to monitor the dispersions in both of these signals to detect scenes. The two examples given above were for two or more different combinations of the YUV bytes, or two or more different combinations of the RGB bytes. Here we present another example based on the VCV values presented above. In this example, at each selected frame, we generate the VCV value as before, and also generate a value representative of the lowest pixel data value, which we call MIN_CV, and a value representative of the highest pixel data value, which we call MAX_CV. FIG. 5A shows a graph of these three video content signals over several selected video frames for the same sample video medium used in FIG. 4A Gust the latter portion, however, is used). As before, a scene end begins at frame $F_A$ with a fading of the image over approximately 1 second, and finishes at frame $F_B$ with the video frames being uniformly painted with a color. The average of each of the video-content signals over a moving window is shown by dashed lines in the figure, and each is representative of a central tendency of the video-content signal. These are indicated as MIN_AVG for MIN_CV, AVG for VCV, and MAX_AVG for MAX_CV. FIG. 5B shows the standard deviations of the video-content signals with respect to their respective averages: MIN_SD for MIN_CV, VCV_SD for VCV, and MAX_SD for MAX_CV. Prior to frame $F_C$, one or more of the standard deviation signals (MIN_SD, VCV_SD, and MAX_SD) are above a common threshold level, and the scene-detection signal is generated in its first state (indicating the presence of a scene). By frame $F_C$ and afterwards, all of the standard deviation signals are below the threshold level, and the scene-detection signal may then be generated in its second state (indicating the absence of a scene). This is illustrated in FIG. 5C.

Now that we have introduced the MIN_CV and MAX_CV values, we describe yet another way to assess the spatial and temporal dispersion of the pixel data values that requires less computational effort. As before, the MIN_CV and MAX_CV values are generated, and the moving window is used. The MIN_CV and MAX_CV values are examined in the window (as it moves) to generate a global maximum value $G_{MAX}$, and a global minimum value $G_{MIN}$. $G_{MAX}$ is the maximum of the MAX_CV values within the window, and the $G_{MIN}$ is the minimum of the MIN_CV values within the window. The dispersion signal at the current selected frame is generated as the difference quantity ($G_{MAX}-G_{MIN}$). FIG. 6A shows a graph of MAX_CV, MIN_CV, and the difference ($G_{MAX}-G_{MIN}$) over several selected video frames for the same sample video medium used in FIG. 5A. As before, a scene end begins at frame $F_A$ with a fading of the image over approximately 1 second, and finishes at frame $F_B$ with the video frames being uniformly painted with a color. The difference ($G_{MAX}-G_{MIN}$) decreases to zero after a scene end occurs because the minimum and maximum pixel values of a uniformly painted screen are the same. Therefore, the difference may be directly used as a measure of the dispersion. The threshold level for detecting the scene is shown on FIG. 6A. The scene-detection signal may then be generated in its first state (scene present) prior to frame $F_C$ when the difference is above the threshold level, and may be generated in its second state (scene absent) after frame $F_C$ when the difference ($G_{MAX}-G_{MIN}$) falls below the threshold level, as illustrated in FIG. 6B.

Figure 7:
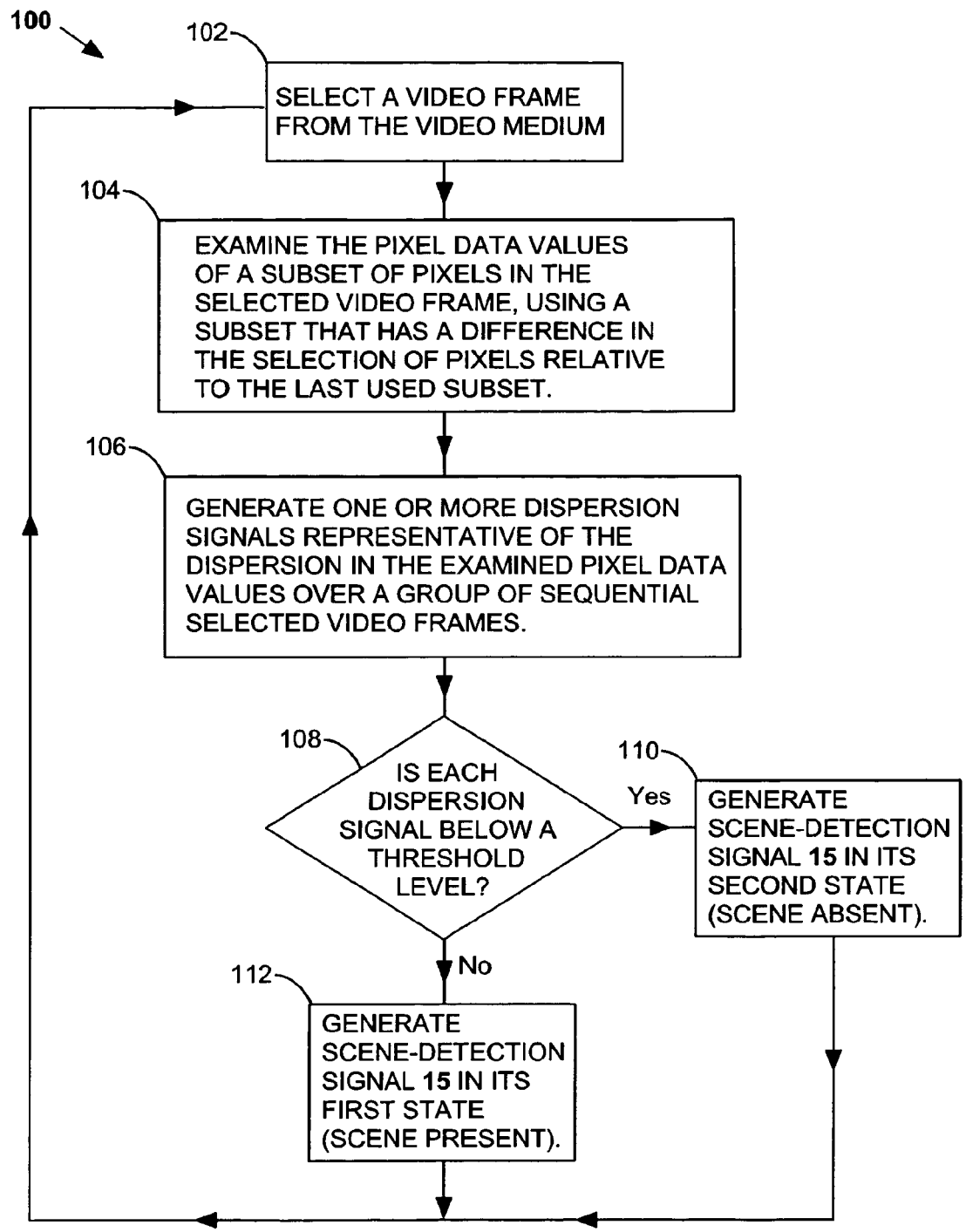
FIG. 7 shows an exemplary flow diagram of exemplary methods according to the present invention.
Figure 8:
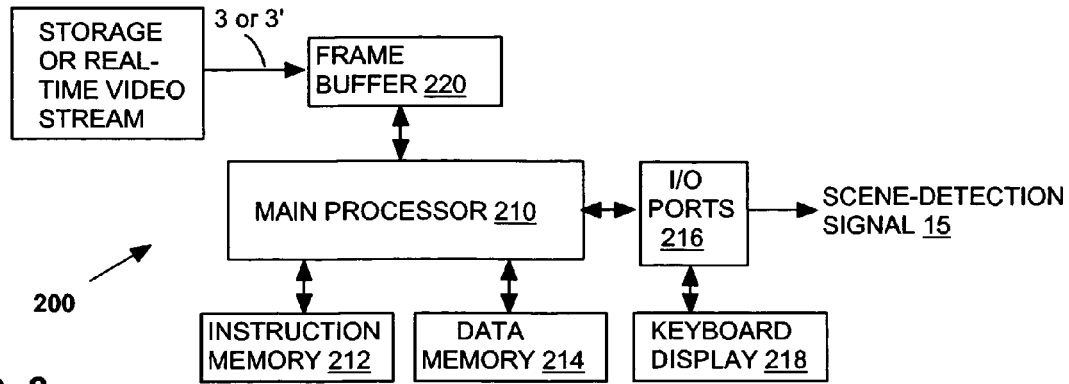
FIG. 8 is a schematic diagram of an exemplary apparatus according to the present invention.
Figure 9:
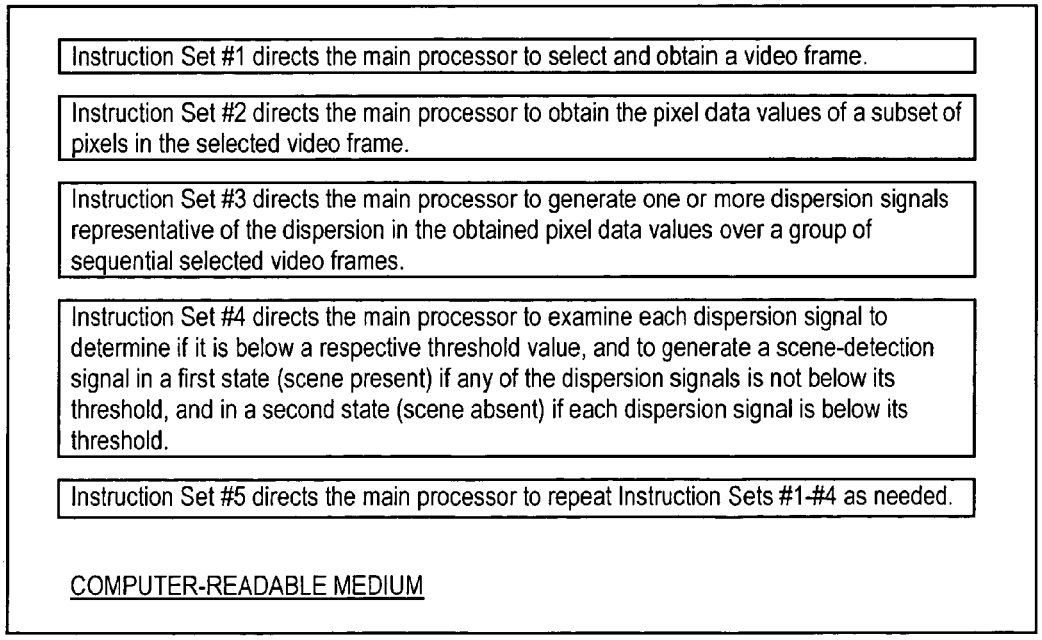
FIG. 9 shows the computer instruction sets of an exemplary computer program product according to the present invention.

FIG. 7 shows an exemplary flow diagram 100 for exemplary methods according to the present invention, and FIG. 8 shows an exemplary apparatus 200 for carrying out the exemplary methods illustrated by FIG. 7. Apparatus 200 comprises a main processor 210, an instruction memory 212 for storing instruction sets that direct the operation of main processor 210, a data memory 214 for storing data values used by the methods and processor 210 during the execution of the processing steps (e.g., storage of the video content signals and dispersion signals), a conventional I/O port 216 that is coupled to a keyboard/display unit 218, and a frame buffer 220 for receiving and temporarily storing video medium 3 or 3'. Each of components 212, 214, 216 and 220 is coupled to main processor 210 through a bidirectional bus structure. Memory 212 and 214 may be coupled to processor 210 through a dedicated memory bus, and may be implemented as different sections of the same memory. Frame buffer 220 may be coupled to main processor 210 through its own dedicated parallel bus, with commands being provided to it by dedicated signal lines or by data writes to specific address locations, with status being read from other specific address locations. It may have the capacity to store one or more complete video frames. I/O ports 216 may use the same bus as memories 212 and 214. The end-scene detection signal 15 may be provided as an output of I/O port 216, or as a software flag stored in data memory 214. Keypad/display unit 218 may be used to receive instructions and configuration parameters from the human user, and to provide an indication of the operation status of apparatus 200, including the detection of scenes. The operation of main processor 210 is guided by a group of instruction sets stored in instruction memory 214, which is an exemplary form of computer-readable medium. These instruction sets are illustrated in FIG. 9, and the operation of the methods and processor 210 are explained below with reference to flow diagram 100 (FIG. 7) and the instruction sets (FIG. 9).

Referring to FIG. 7, flow diagram 100 comprises process blocks 102-112. At process block 102, the method selects a complete video frame from the video medium (e.g., stream 3 or 3'), as described above. Instruction set #1 shown in FIG. 9 directs processor 210 to perform this task. If the video medium is statically stored in a storage memory, instruction set #1 may direct main processor 210 to read this frame from the storage memory. If the video medium is being streamed in real-time, the method and instruction set #1 may comprise background instructions that instruct main processor 210 and/or frame buffer 220 to collect video frames and clear them from buffer 220 after they have been used, and/or clear them to make room for the next video frame whether or not they have been used. Such buffer control techniques are well known to the computer art, and a detailed explanation is not needed here.

The method then proceeds to process block 104 (FIG. 7), where the pixel data values of a subset of pixels in the selected video frame are obtained. Instruction set #2 (FIG. 9) directs main processor 210 to perform this task, which includes identifying the pixel subset to use for the particular video frame, and then obtaining the pixel data values for the identified subset. As described above, the method uses a subset that has a difference in the selection of pixels relative to the last pixel subset used. At this point, the pixel data values specified by the pixel subset may be read from frame buffer 220, and an instruction may thereafter be given to the background instructions of instruction set #1 to clear frame buffer 220, if needed.

The method then proceeds to process block 106 (FIG. 7), where it generates one or more dispersion signals representative of the dispersion in the obtained pixel data values over a group of sequential selected video frames, as described above. Instruction set #3 (FIG. 9) directs main processor 210 to perform this task, which includes the instructions for generating the particular video content signals and dispersion signals desired for a particular implementation. These instructions can be readily composed by one of ordinary skill in the art without undue experimentation in view of the above discussion of exemplary approaches that may be used.

At decision block 108 (FIG. 7), each dispersion signal is examined to determine if it is below a respective threshold level. If yes, the method interprets the result as indicating an absence of a scene and proceeds to process block 110, where the scene-detection signal 15 is generated in its second state. If no, the method interprets the result as indicating the presence of a scene and proceeds to process block 112, where scene-detection signal 15 is generated in its first state. From process block 112, the method proceeds back to process block 102, to select another video frame from the video medium. From process block 110, the method also proceeds back to process block 102, where it selects a new video frame. Instruction set #4 (FIG. 9) directs main processor 210 to perform the tasks of examining each dispersion signal to determine if it is below a respective threshold value, and of generating the end-scene signal 15 in its appropriate state according to the logic of process blocks 108-112. Instruction set #5 instructs main processor 210 to return to process block 102, and to repeat blocks 102-112 and instruction sets #1-#4 as long as needed, which may be determined by the user or by detection of an end of the tape by a long duration of scene-detection signal 15 being in its second state.

Process block 102 (FIG. 7) and instruction set #1 (FIG. 9) may be configured to select a new video frame in a video medium that is streaming in real-time, regardless of whether the new frame is the next frame in the sequence of the video medium or a frame that is several frames ahead of the last frame processed. The former case may occur where the method is implemented on a processor 210 that can complete process blocks 104-112 and instruction sets #1-#5 in less time than it takes to collect a video frame in frame buffer 220. The latter case may occur when process 210 cannot complete process blocks 104-112 and instruction sets #1-#5 in the time it takes to collect a video frame in buffer 220, and when the background instructions have cleared buffer 220 of the next frame in the sequence. In this latter case, the frames are selected at a reduced rate by the method and main processor 210, in either a periodic or aperiodic manner.

It may be appreciated that the group of instruction sets #1-#5 may be implemented as a computer program product separate from apparatus 200 and embodied in a computer-readable medium. The computer-readable medium may comprise many forms, such as for example ROM, RAM, magnetic tape, magnetic disk, streaming bit medium (e.g., downloads from the Internet), etc.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of detecting one or more scenes in a video medium, the video medium defining an array of pixels for displaying its video content and comprising a sequence of video frames, each video frame having a set of pixel data values for representing an image on the array of pixels, each pixel data value being associated with a pixel in the array, the method comprising the steps of:
   (a) selecting a plurality of video frames from the video medium, the selected video frames having a sequential order related to the order in which they occur in the video medium];
   (b) obtaining the pixel data values of a subset of pixels of each selected video frame, the pixel subsets of at least one pair of successive selected video frames having a difference in the selection of pixels;
   (c) generating a dispersion signal representative of the dispersion in the obtained pixel data values over a group of sequential selected video frames;
   (d) generating a scene-detection signal having a first state indicating the presence of a scene and a second state indicating the absence of a scene, the scene-detection signal being generated as a function of at least the dispersion signal and a threshold level; and
   wherein step (c) comprises:
   (e) generating a first video content value for each selected video frame as a first function of the obtained pixel data values for the selected video frame and a second video content value for each selected video frame as a second function of the obtained pixel data values for the selected video frame;
   (f) generating the first dispersion signal as a third function of the first video content values over the group of sequential selected video frames; and
   (g) generating a second dispersion signal as a fourth function of the second video content values over the group of sequential selected video frames; and
   wherein step (d) comprises the step of generating the scene-detection signal in its second state when both the first and second dispersion signals are below respective threshold levels, and the step of generating the scene-detection signal in its first state when one or more of the dispersion signals are above their respective threshold levels; and further comprising
   (h) providing the scene-detection signal to indicate the presence and absence of the scene.

2. The method of claim 1 wherein the first function produces the same value with each of the pixel subsets when the selected video frame is uniformly painted with a color at a uniform luminescence, and produces different values with at least two of the pixel subsets when the selected video frame has a non-uniform color.

3. The method of claim 2 wherein the first function produces respective values when a selected video frame is uniformly painted with different respective colors at a uniform luminescence, each respective value being the same with each of the pixel subsets.

4. The method of claim 1 wherein the first function produces the same value with each of the pixel subsets when the selected video frame is uniformly painted with a color at a uniform luminescence, and produces different values with at least two of the pixel subsets when the selected video frame has a non-uniform luminescence.

5. The method of claim 4 wherein the first function produces respective values when a selected video frame is uniformly painted with different respective luminescence values of the same color, each respective value being the same with each of the pixel subsets.

6. The method of claim 1 wherein the pixel data values are in YUV format, and wherein the first function comprises the summation of the Y-values of a pixel subset.

7. The method of claim 1 wherein the pixel data values are in YUV format;
wherein step (e) further comprises the step of concatenating the Y-, U-, and V-bytes of each obtained pixel data value to form a concatenated value; and
wherein the first function comprises the summation of the concatenated values of a pixel subset.

8. The method of claim 1 wherein step (f) generates an average of the video content values for the group of sequential selected video frames, and wherein the second function generates the dispersion signal in relation to a variance of the video content values from the average.

9. The method of claim 1 wherein step (f) generates a central tendency value of the video content values for the group of sequential selected video frames, and wherein the second function generates the dispersion signal in relation to a deviation of the video content values from the central tendency value.

10. The method of claim 1 wherein the second function generates the dispersion signal as the difference between the maximum and minimum of the video content values in the group of sequential selected video frames.

11. The method of claim 1 wherein step (a) selects all of the video frames in a sequence of video frames of the video medium.

12. The method of claim 1 wherein step (a) selects a reduced number of video frames in a periodic manner from a sequence of video frames of the video medium.

13. The method of claim 1 wherein step (a) selects a reduced number of video frames in an aperiodic manner from a sequence of video frames of the video medium.

14. The method of claim 1 wherein the number of pixels in a pixel subset is not more than 1% of the total number of pixels in the selected video frame.

15. The method of claim 1 wherein the number of pixels in a pixel subset ranges from 200 to 800.

16. The method of claim 1 wherein at least 25% of the pixels in the pixel subsets for each pair of successive selected video frames are different.

17. The method of claim 1 wherein at least 50% of the pixels in the pixel subsets for each pair of successive selected video frames are different.

* * * * *